United States Patent [19]

Bjork

[11] 4,159,152

[45] Jun. 26, 1979

[54] MEANS FOR LUBRICATING THE ROLL NECK/SLEEVE INTERFACE OF AN OIL FILM BEARING

[75] Inventor: John A. Bjork, Worcester, Mass.

[73] Assignee: Morgan Construction Company, Worcester, Mass.

[21] Appl. No.: 841,167

[22] Filed: Oct. 11, 1977

[51] Int. Cl.² .............................................. F16C 13/02
[52] U.S. Cl. ..................................... 308/240; 72/236; 308/9; 308/121
[58] Field of Search ................... 308/9, 20, 37, 70, 78, 308/92, 93, 97, 98, 100, 108, 121, 122, 237 A, 240; 72/236

[56] References Cited

U.S. PATENT DOCUMENTS 3,453,031  7/1969  Rickley et al. ............................ 308/9

FOREIGN PATENT DOCUMENTS 738343  10/1932  France ..................................... 308/240
295405  1/1929  United Kingdom ..................... 308/240

*Primary Examiner*—Charles E. Frankfort
*Attorney, Agent, or Firm*—Thompson, Birch, Gauthier & Samuels

[57] ABSTRACT

An oil film bearing for a roll neck in a rolling mill, wherein a sleeve with a tapered bore in mounted on a tapered section of the roll neck for rotation therewith, the sleeve being journalled in a non-rotatable bushing contained in a bearing chock. During rolling, a film of high pressure oil is maintained hydrodynamically between the sleeve and bushing at the bearing load zone. In order to provide lubrication at the roll neck/sleeve interface, a portion of the hydrodynamic oil is bled from the sleeve/bushing interface via holes extending radially through the sleeve into a plurality of longitudinal primary grooves in the sleeve bore. This conventional arrangement is improved by the addition of a plurality of secondary grooves in the sleeve bore. Oil is forced from the primary grooves into the second grooves via connecting grooves in the sleeve bore. The connecting grooves create a pressure differential which opposes reverse flow of oil from the secondary grooves into the primary grooves.

5 Claims, 7 Drawing Figures

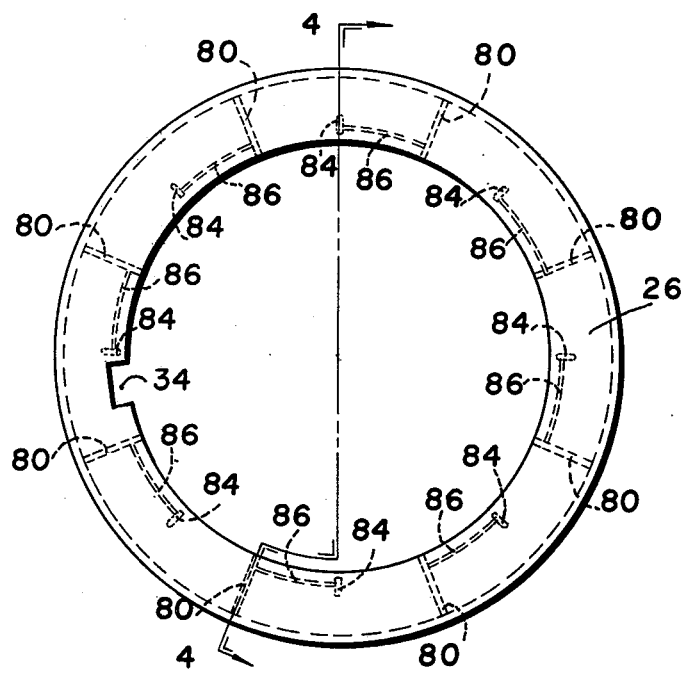
Fig. 3
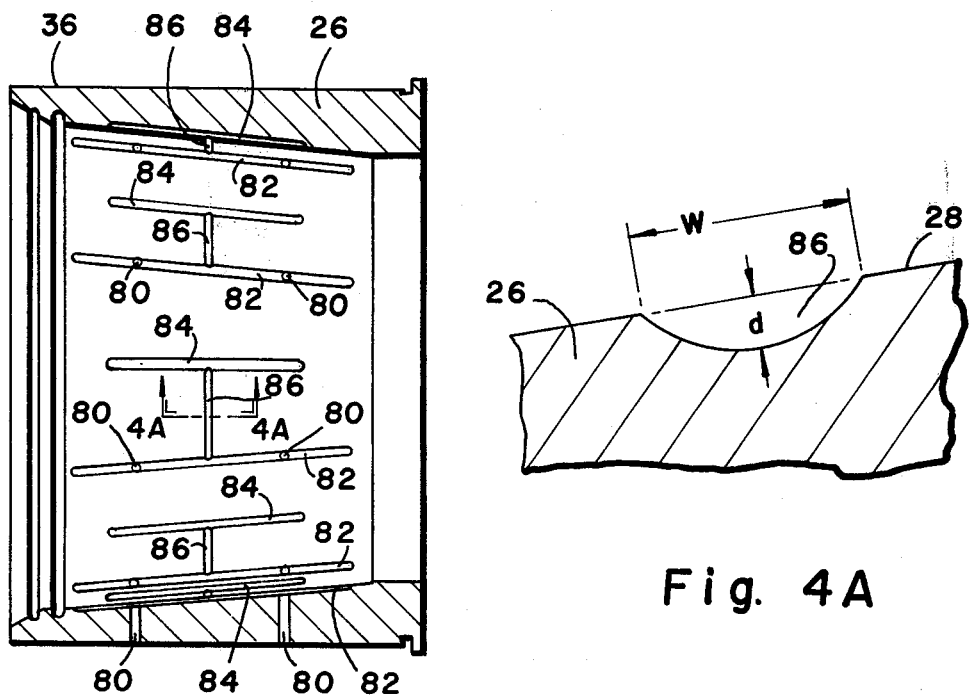
Fig. 4
Fig. 4A

MEANS FOR LUBRICATING THE ROLL NECK/SLEEVE INTERFACE OF AN OIL FILM BEARING

DESCRIPTION OF THE INVENTION

This invention relates generally to roll neck bearings in rolling mills, and in particular to "oil film" bearings wherein the roll neck is surrounded by a sleeve which is journalled in a non-rotatable bushing contained in the bearing chock. The term "oil film" is derived from the fact that during operation of the mill, a high pressure film of oil is maintained hydrodynamically between the sleeve and bushing at the bearing load zone.

The sleeve is usually provided with a tapered bore which is received on a tapered section of the roll neck. The interference fit between the mating tapered surfaces is purposely made relatively slight to provide a non-locking relationship which facilitates disassembly of the sleeve from the roll neck. This relatively slight interference fit is not tight enough to prevent limited relative rotation (referred to as "microcreep") between the sleeve and roll neck during operation under load. Consequently, without adequate lubrication between the mating tapered surfaces, microscopic wear (referred to as "fretting") is likely to occur. In extreme cases, this can result in permanent damage to the sleeve and/or roll neck.

In the past, lubrication of the mating tapered surfaces at the roll neck sleeve interface has been effected by conducting high pressure hydrodynamic oil from the bearing load zone through radial feed holes in the sleeve into primary grooves in the tapered sleeve bore. Although this arrangement has met with some success, there are still numerous cases where fretting persists in various degrees of severity. In these cases, it has been deemed impractical to merely increase the number of primary grooves and associated feed holes because of the potential danger of bleeding off a penalizing amount of load carrying hydrodynamic oil from the bearing load zone.

The primary objective of the present invention is the provision of an improved means for lubricating the roll neck/sleeve interface of an oil film bearing.

Another object of the present invention is the provision of means for increasing the amount of lubricant at the roll neck/sleeve interface of an oil film bearing without bleeding off a penalizing amount of load carrying hydrodynamic oil from the bearing load zone.

A more specific object of the present invention is to improve known lubricating arrangements where high pressure oil is conducted from the bearing load zone through radial feed holes in the sleeve into primary grooves in the tapered sleeve bore, by providing additional secondary grooves in the sleeve bore which are fed from the primary grooves via connecting means in the sleeve bore, the said connecting means also being operative to create a pressure differential which opposes reverse flow of lubricant from the secondary grooves into the primary grooves. Preferably, the connecting means comprises connecting grooves in the sleeve bore which are dimensioned and/or oriented with respect to the primary and secondary grooves to provide the aforesaid pressure differential.

These and other objects and advantages of the present invention will become more apparent as the description proceeds with the aid of the accompanying drawings, wherein:

FIG. 3 is an end view on a reduced scale of the sleeve shown disassembled from the roll neck and the other components of the bearing assembly;

FIG. 4 is a sectional view taken along line 4—4 of FIG. 3;

FIG. 4A is a sectional view on a greatly enlarged scale taken along lines 4A—4A of FIG. 4;

Figure 1:
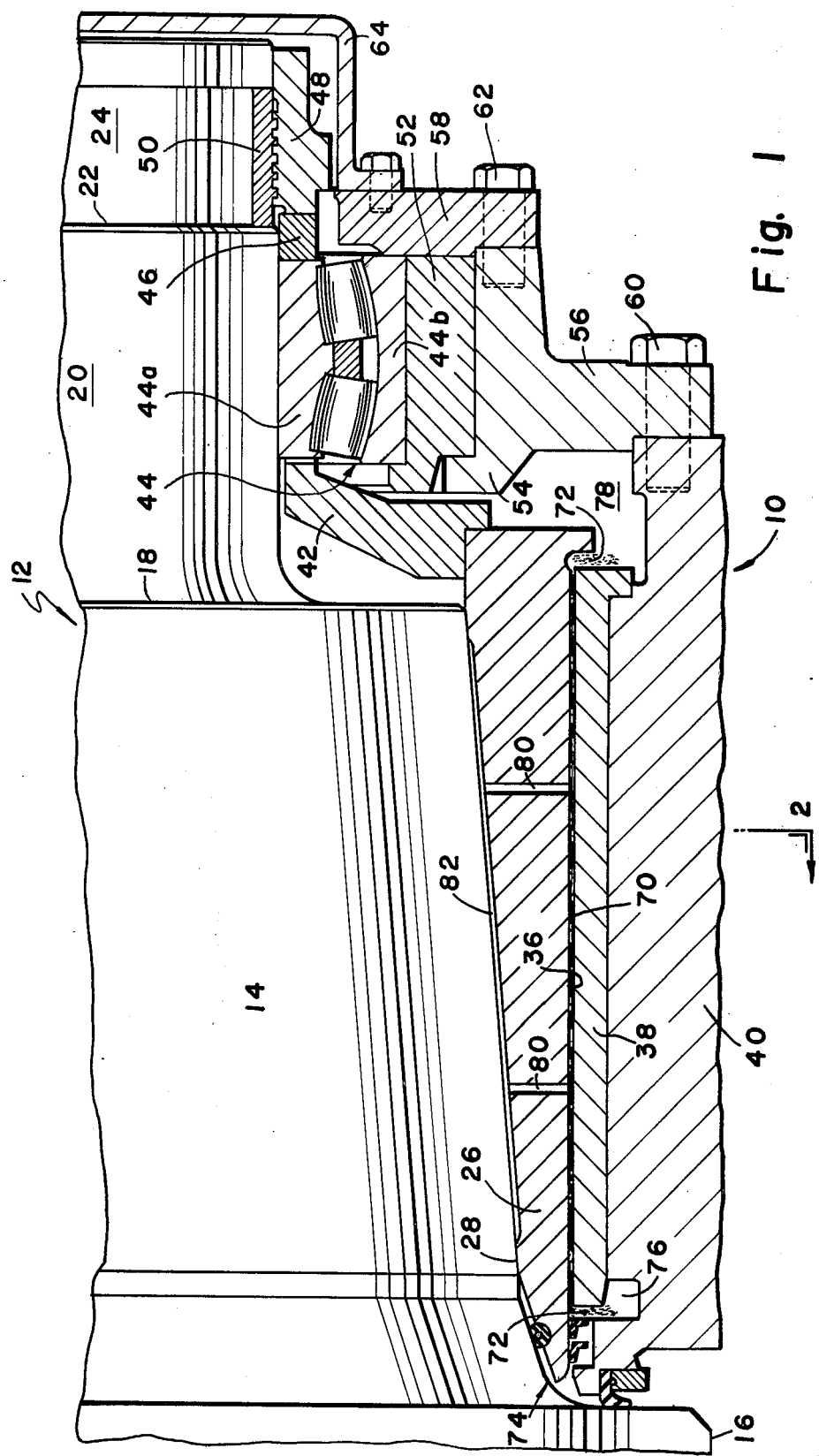
FIG. 1 is a partial cross-sectional view taken through an oil film bearing for a roll neck in a rolling mill.

Referring now to the drawings, there is shown at 10 an oil film bearing for a roll neck 12 of a lower roll in a rolling mill. The roll neck has a tapered section 14 extending from the roll barrel 16 to a shoulder 18, which in turn leads to a reduced diameter section 20, followed by another shoulder 22, and a still further reduced diameter end section 24. The bearing includes a sleeve 26 having a tapered bore 28 received on the tapered neck section 14. A key 30 is fitted into aligned keyways 32 and 34 in the roll neck and sleeve respectively. The external cylindrical surface 36 of the sleeve 26 is journalled for rotation in a non-rotatable bushing 38 which is in turn contained in a bearing chock 40.

The sleeve 26 is axially held on the tapered section 14 by means of a sleeve ring 42 which is in contact with one end of the inner race 44a of a roller thrust bearing 44. The opposite end of the inner race is engaged by another ring 46 which is acted upon by a lock nut 48 threaded onto a split ring 50. The outer race 44b of roller thrust bearing assembly 44 is held in a roller bearing housing 52. The housing 52 is gripped between an internal flange 54 on an inner end plate 56 and an outer end plate 58. The inner end plate 56 is bolted to the chock as at 60, and the outer end plate 58 is bolted to the inner end plate 56 as at 62. An end cover 64 completes the bearing enclosure.

Figure 2:
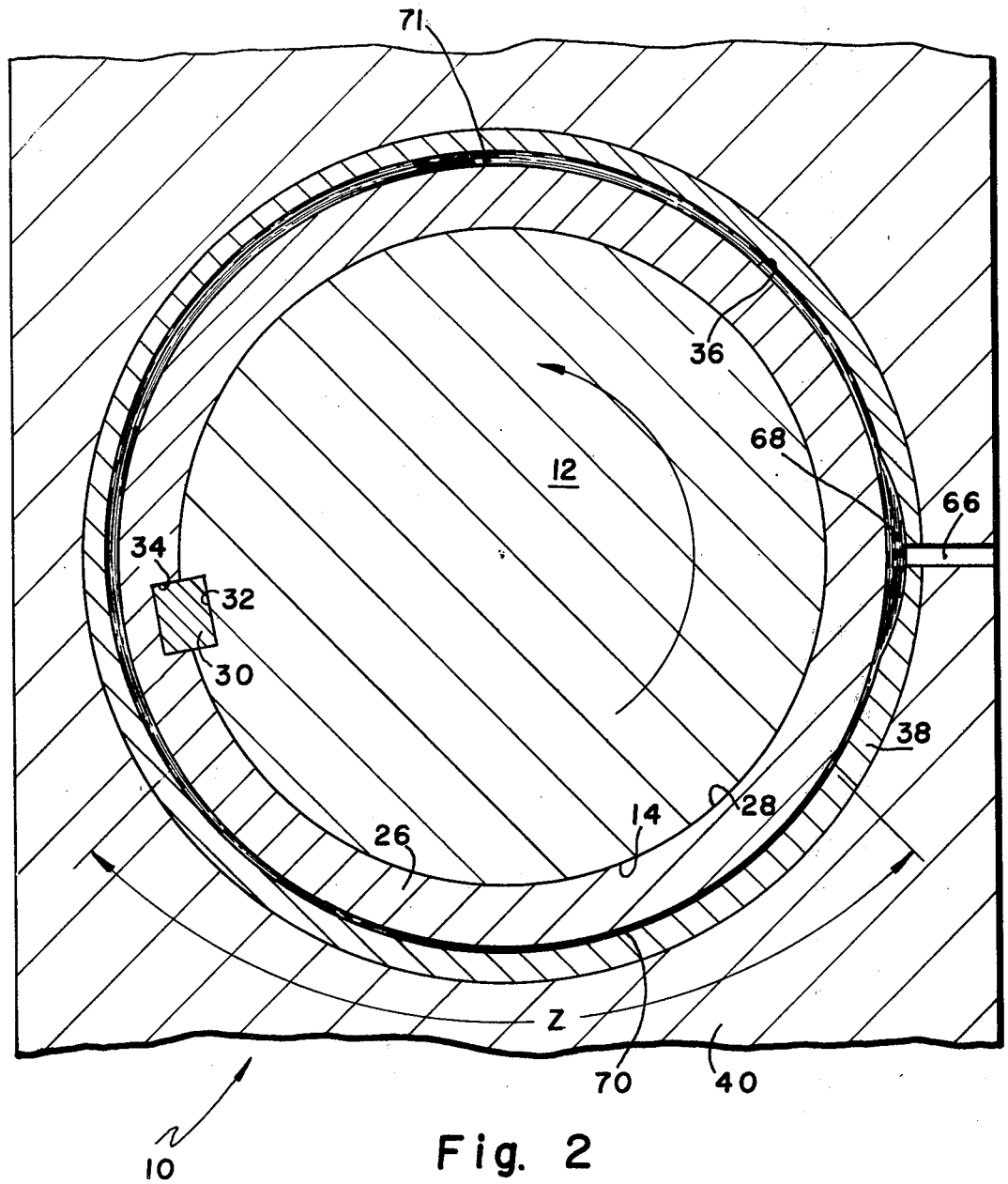
FIG. 2 is a somewhat schematic sectional view through the bearing taken along lines 2—2 of FIG. 1.

As can be best seen in FIG. 2, during rolling, oil is admitted continuously between the bushing 38 and sleeve 26 through a passageway 66 in the chock 40 leading to a machined depression (referred to as a "rebore") 68 in the interior surface of the bushing. The oil is carried by the rotating sleeve through approximately 180° where it is hydrodynamically formed into a high pressure film 70 at the bearing load zone "Z". Typically, maximum oil pressures in the load zone can be in the range of 4,000 to 12,000 p.s.i., whereas in the unloaded area opposite to that of the load zone, for example at 71, pressures are likely to be at or about atmospheric. During operation of the mill, oil escapes continuously from opposite ends of the sleeve/bushing interface as at 72. The seal assembly generally indicated at 74 serves to contain the escaping oil while excluding external contaminants such as cooling water, mill scale, etc. The escaping oil is collected in sumps 76 and 78 and recirculated by conventional return piping (not shown) for cooling and filtering.

The interference fit between the mating tapered surfaces 14 and 28 is purposely made relatively slight so as to provide a non-locking relationship when the sleeve is axially pushed onto the roll neck 12 by the lock nut 48 acting through the inner bearing race 44a and the sleeve ring 42. This facilitates maintenance by making it easier to separate the sleeve from the roll neck. However, this relatively slight interference fit is not tight enough to prevent limited rotation or "microcreep" of the sleeve relative to the roll neck during operation under load. Thus, to the extent permitted by the normal working clearances between the key 30 and its keyways 32, 34, microcreep takes place, making it necessary to lubricate the roll neck/sleeve interface in order to avoid damaging microscopic wear.

In the past, this task has been accomplished by conducting high pressure oil from the bearing load zone Z through radial feed holes 80 in the sleeve 26 into a plurality of primary grooves 82 in the tapered sleeve bore 28. The grooves 82 extend longitudinally in the direction of the sleeve axis and are spaced angularly around the tapered bore. One of the problems with this arrangement is that the maximum number of grooves 82 and associated feed holes 80 which can be used with a given bearing size must necessarily be limited so as not to bleed off a penalizing amount of the load carrying hydrodynamic oil from the load zone. Another problem with this arrangement stems from the fact that, apparently, as the grooves 82 and their associated feed holes 80 rotatably move out of the bearing load zone, centrifugal force takes over and produces a reverse oil flow tending to remove oil from the feed holes 80 and grooves 82. It is now believed that these problems have caused the inadequate lubrication heretofore experienced at the roll neck/sleeve interface.

The present invention avoids these problems by feeding more oil to the roll neck/sleeve interface without increasing the number of primary grooves 82 and associated radial feed holes 80. In the preferred embodiment best shown in FIGS. 3 and 4, this is accomplished by adding a plurality of secondary grooves 84 in the tapered bore 28 of the sleeve. The secondary grooves are preferably somewhat shorter than the primary grooves 82. The secondary grooves 84 are not fed by radial holes in the sleeve, but instead receive oil indirectly from the bearing load zone Z through intermediate connecting grooves 86 leading from the primary grooves 82. Preferably the grooves 82, 84 and 86 have a cross-sectional configuration as shown in FIG. 4A. The cross-sectional dimensions of the primary and secondary grooves 82, 84 are preferably the same, whereas the cross-sectional dimensions of the connecting grooves 86 are smaller. In this manner, the flow restricting characteristics of the connecting grooves 86 is increased, which in turn creates a high pressure differential between the primary and secondary grooves 82, 84. This pressure differential opposes reverse flow of oil from the secondary grooves 84 back through the connecting grooves 86.

In operation, as each primary groove rotates through the bearing load zone Z, high pressure oil is received therein from the sleeve/bushing interface through the radial feed holes 82. From here, the oil continues through the connecting groove 86 to the secondary groove 84. The high pressure of the oil at the load zone (typically on the order of 4,000 to 12,000 p.s.i.) is sufficient to overcome the flow restricting characteristics of the connecting groove 86, and hence oil reaches into the entire communicating network of grooves 82, 84 and 86 before the feed holes 80 exit from the bearing load zone Z. Typically, the flow restricting characteristics of the grooves 86 are on the order of 100 to 400 p.s.i. As is best shown in FIGS. 3 and 4, there is a plurality of such discrete circumferentially isolated groove networks arranged around the sleeve bore. As each groove network continues to rotate into the unloaded zone where lower pressures at or about atmospheric prevail, centrifugal force has a tendency to radially pull oil out of the feed holes 80, thus encouraging a reverse exiting flow of oil in the communicating grooves 82, 84 and 86. The pressure levels due to centrifugal force are relatively low, typically less than 10% of the flow restricting characteristics of the grooves 86. Thus reverse flow is effectively opposed, with the result that more oil remains in the entire groove network. This appears to be an important factor contributing to the resulting improved lubrication of the roll/neck sleeve interface. This result is achieved without increasing the number of radial feed holes 80 above the maximum number now thought to be permissible for a given bearing size.

By way of example with regard to the embodiment just described, for a sleeve having an outer diameter of approximately 30", eight primary grooves 82 and eight secondary grooves 84 are believed sufficient. The primary and secondary grooves are preferably provided with a width "W" of approximately $\frac{1}{4}$" and a depth "d" of $\frac{1}{8}$". In contrast, the connecting grooves 86 preferably have a width of $\frac{1}{8}$" and a depth of 1/64". These dimensions are merely illustrative of the cross-sectional differences between the connecting grooves and the primary and secondary grooves which are considered appropriate for providing the desired flow restricting characteristics.

Figure 5:
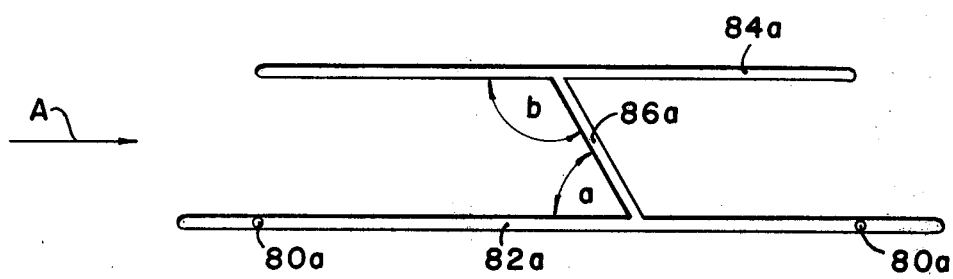
FIGS. 5 and 6 are partial views similar to FIG. 4 showing alternate embodiments of the invention.

Referring now to FIG. 5, a second embodiment of a communicating groove network is shown. Here again, each network includes a primary groove 82a fed by radial holes 80a, and a secondary groove 84a connected to the primary groove by a connecting groove 86a. The connecting groove is slanted to form, when viewed in the direction "A" from the larger diameter end of the tapered bore, acute and obtuse angles a, b, respectively with the primary and secondary grooves. With the connecting groove slanted in this manner, it is not necessary (although it might be deemed desirable) to design it as a restrictor. The slanted attitude of the connecting groove on the tapered bore means that the radial distance from the sleeve axis to a point on the connecting groove increases as you progress from the primary groove 82a to the secondary groove 84a. Consequently, during mill operation when the sleeve is rotating at high speeds with the roll neck, centrifugal force on oil particles in the connecting groove increases in the direction of oil delivery from the primary groove 82a towards the secondary groove 84a, thus creating a pressure differential which opposes oil flow in the reverse direction as each groove network moves out of the bearing load zone.

Figure 6:
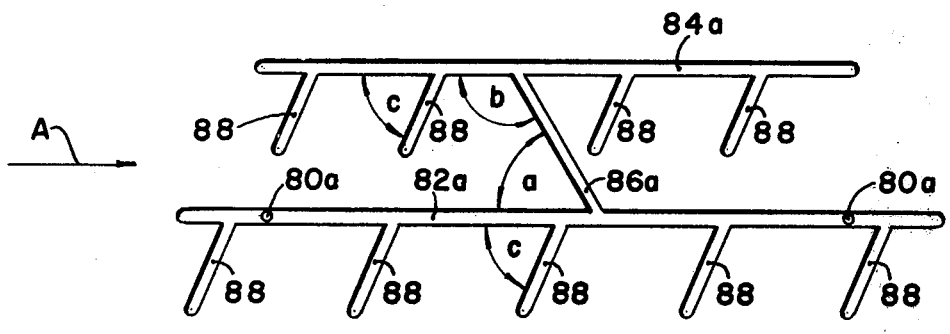

Still another embodiment of the invention is depicted in FIG. 6, wherein additional blind grooves 88 lead laterally away from both the primary grooves 82a and the secondary grooves 84a. The blind grooves are slanted with respect to the primary and secondary grooves to form acute angles c when viewed in the direction "A" from the larger diameter end of the tapered bore. Preferably, the grooves 88 are relatively shallow in comparison to the secondary grooves 84a. This arrangement is intended to provide a still further improved distribution of oil at the roll neck/sleeve interface.

I claim:

1. In an oil film bearing for a roll neck in a rolling mill, wherein a sleeve with a tapered bore is mounted on a tapered section of the roll neck for rotation therewith, the sleeve being journalled in a non-rotatable bushing contained in a bearing chock, with a hydrodynamic film of high pressure oil being maintained during rolling between the sleeve and bushing at the bearing load zone while approximately atmospheric pressure prevails between the sleeve and bushing in the unloaded zone opposite to the load zone, and with a portion of said high pressure oil being conducted from the bearing load zone to the roll neck/sleeve interface via feed holes extending radially through the sleeve into a plurality of primary grooves which extend longitudinally in the direction of the sleeve axis and which are circumferentially spaced around the sleeve bore, the improvement comprising: a plurality of secondary grooves in the sleeve bore intersperced between the primary grooves; and, connecting grooves in the sleeve bore for supplying oil from the primary grooves to the secondary grooves, said connecting grooves extending transversely between and being in communication at opposite ends respectively with adjacent primary and secondary grooves, with the interconnected primary, secondary and connecting grooves forming a plurality of discrete circumferentially isolated groove networks which are sequentially charged with high pressure oil as each rotates through the bearing load zone, said connecting grooves being adapted to maintain a pressure differential opposing an exiting flow therethrough of oil from the secondary grooves as a result of centrifugal force acting on the oil in the groove network rotating through said unloaded zone.

2. The apparatus of claim 1 wherein said connecting grooves are smaller in cross-section than said primary and secondary grooves.

3. The apparatus of claim 1 wherein said connecting grooves are slanted to form, when viewed from the larger diameter end of said tapered bore, acute and obtuse angles respectively with said primary and secondary grooves.

4. The apparatus of claim 1 further comprising additional blind grooves in the sleeve bore leading laterally away from said secondary grooves.

5. The apparatus of claim 4 wherein said additional blind grooves are slanted with respect to said secondary grooves to form acute angles facing in the direction of the large diameter end of said tapered bore.

* * * * *